Figure 1A:
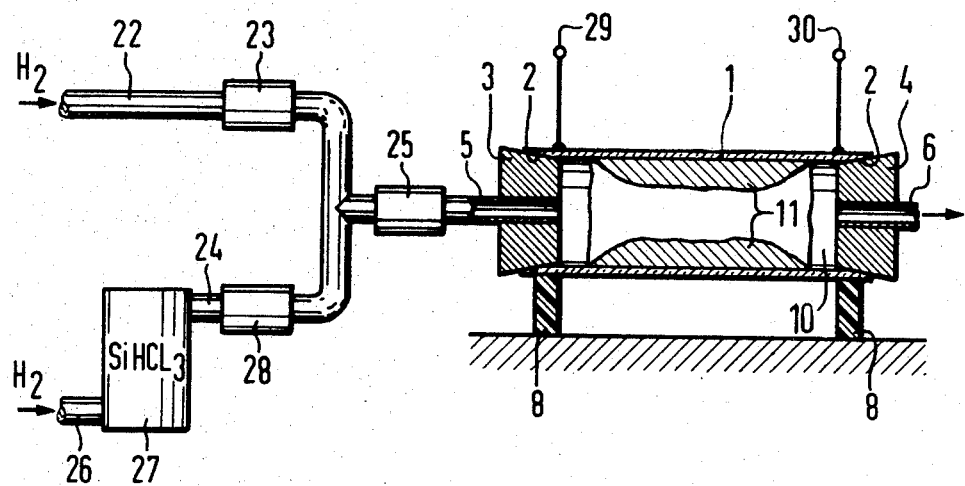

United States Patent
Reuschel

[11] 3,865,647
[45] Feb. 11, 1975

[54] METHOD FOR PRECIPITATION OF SEMICONDUCTOR MATERIAL

[75] Inventor: Konrad Reuschel, Vaterstetten, Germany

[73] Assignee: Siemens Aktiengesellschaft, Munich, Germany

[22] Filed: Apr. 5, 1973

[21] Appl. No.: 348,259

Related U.S. Application Data

[63] Continuation-in-part of Ser. No. 167,137, July 29, 1971, abandoned, which is a continuation-in-part of Ser. No. 108,725, Jan. 22, 1971, abandoned.

[30] Foreign Application Priority Data
Sept. 30, 1970 Germany............................ 2048155

[52] U.S. Cl.................... 148/175, 148/1.5, 148/1.6, 423/345, 423/350, 117/106 R, 117/201, 252/62.3 E, 252/62.3 GA
[51] Int. Cl. ............................................. H01l 7/36
[58] Field of Search..................... 148/1.6, 1.5, 175; 423/350, 345; 117/201, 106 A, 106 C; 252/62.3 E, 62.3 GA

[56] References Cited
UNITED STATES PATENTS
3,751,539   8/1973   Reuschel et al. ............... 117/106 A Primary Examiner—G. Ozaki
Attorney, Agent, or Firm—Herbert L. Lerner

[57] ABSTRACT

Silicochloroform and hydrogen flow through a heated rod for example of silicon. The inside of the rod wall is of silicon. The precipitation of silicon takes place within the rod wall to form a growing inner tube.

11 Claims, 3 Drawing Figures

METHOD FOR PRECIPITATION OF SEMICONDUCTOR MATERIAL

This application is a continuation-in-part application of application Ser. No. 167,137, filed July 29, 1971, now abandoned, which in turn is a continuation-in-part application of application Ser. No. 108,725, filed Jan. 22, 1971, now abandoned.

My invention relates to a method for the precipitation of crystalline semiconductor material by reacting a gaseous compound of the semiconductor material, with a gaseous reduction agent on a heated carrier body of the same material.

By way of background, the prior art has employed a quartz reaction vessel into which a mixture of silicochloroform, $SiHCl_3$, and hydrogen, $H_2$, is introduced. The reaction vessel contains a carrier body consisting of silicon rods which are heated to a temperature between 1,050° and 1,250°C. The gaseous mixture reacts approximately, according to the equation:

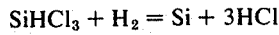

$$SiHCl_3 + H_2 = Si + 3HCl$$

When using starting materials other than $SiHCl_3$, e.g., $SiCl_4$, $SiH_2Cl_2$, $SiI_4$, etc., corresponding reactions are obtained.

Such reaction process is promoted in a desired direction, according to the law of mass action, by increasing the hydrogen content. The precipitation which occurs, depends on both the throughput of the gas mixture, and on the temperature at which the reaction takes place. Precipitation occurs not only at the carrier body, but for instance, also on the inside of the reaction container and other heated portions of the device, if and when such portions are heated to a temperature in excess of 900°C. The semiconductor material, which is precipitated on other parts of the device is caused to react with the impurities contained in these parts, frequently peels off and is transported by the gas current to the carrier body where it becomes installed into the lattice with additional semiconductor material. It is then no longer useful for semiconductor components. The result is a loss of costly semiconductor material.

The object of my invention is to improve the aforementioned type of reaction process so that precipitation at the reaction container will be prevented and semiconductor material will be precipitated only at the carrier body.

To this end, I provide a process employing a tubular carrier body, i.e., semiconductor tube, whose interior is sealed against the outer atmosphere while the interior is connected to a source which delivers a gaseous compound and the reduction agent such that semiconductor material is precipitated and thereafter at least a portion of such tube is caused to melt with the precipitation material.

The tube is preferably enclosed by a coil which is energized with high frequency alternating current. The tube may also be directly connected to a voltage source. The tube may lie out in the open or is situated within a container filled with protective gas.

Figure 1:
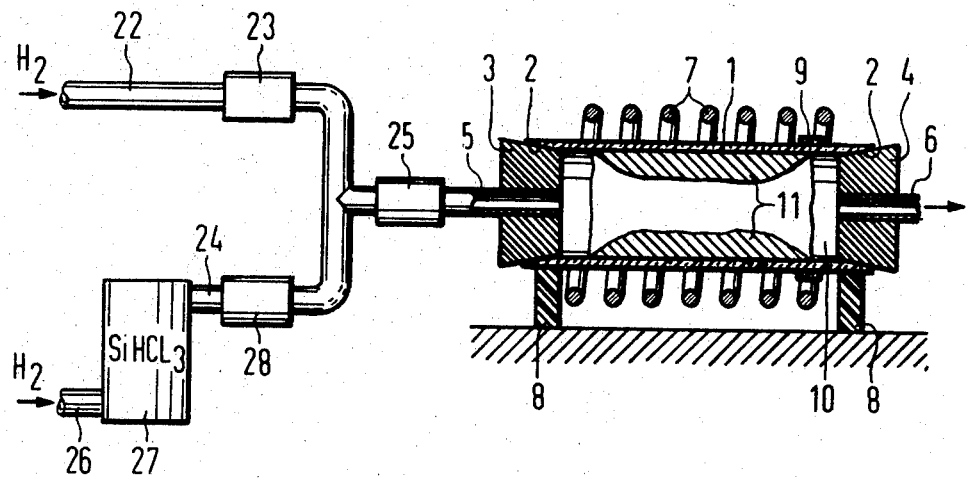
Figure 2:
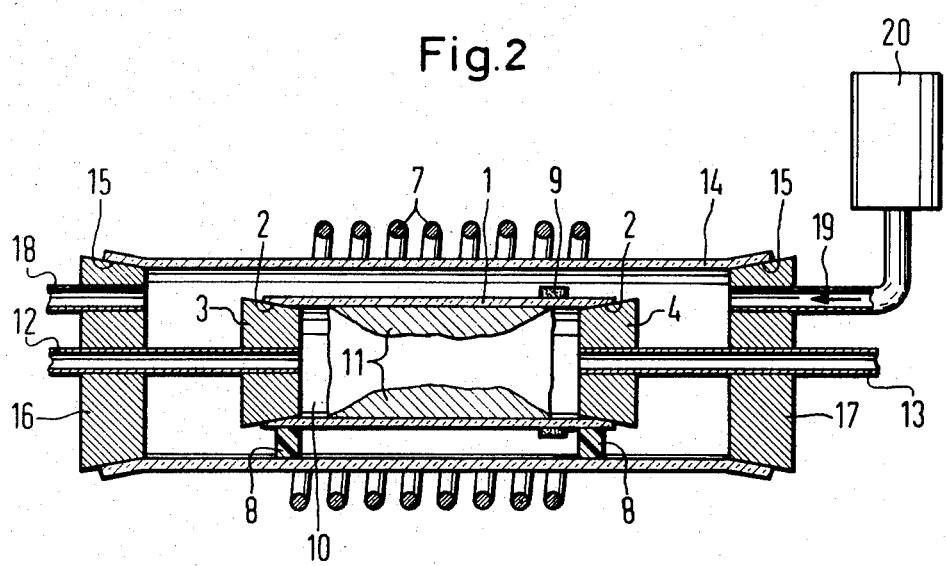

The invention will be described further with respect to the drawing, wherein:

FIGS. 1, 1a and 2 illustrate three different embodiments of the invention.

In FIG. 1, which illustrates an arrangement for precipitating semiconductor material, a tube 1, consisting of the same material as the semiconductor material to be precipitated is employed. Both ends of this tube are provided with conical polished or ground surfaces 2, wherein stoppers 3 and 4 which also have conical polished surfaces, are seated. These stoppers seal the tube 1 against the outside atmosphere. Plug 3 has therein an inlet tube 5 with plug 4, and outlet tube 6. The semiconductor tube 1 is enclosed by a winding 7 and rests on supports 8. A ring 9 of good conductance material, such as graphite, for example, is seated upon the semiconductor tube 1. The tube 1 is provided, via inlet tube 5, with a source which supplies the gaseous compound and the reduction agent. The schematically shown source consists of tubes 22, 24, 26, valves 23, 25, 28 and a container 27.

In order to precipitate semiconductor material, e.g., silicon, the tube 1 of silicon is heated to a temperature of between 1,050° and 1,250°C. The tube may be heated inductively, with the assistance of a high frequency field. To this end, the coil 7 is energized with high frequency alternating current. Since particularly highly pure semiconductor material has poor conductivity in a cold state, the graphite ring heats up first and heats the semiconductor tube 1, by means of thermal conductivity, along its circumference. Starting from this point, the temperature of the semiconductor tube 1, increases so that its resistance drops at these places. Thus, the winding 7 which conducts high frequency alternating current, takes over the heating of the semiconductor tube 1. An alternate approach for heating tube 1 without departing from the scope of the instant invention, contemplates directly traversing such tube with a current. For this purpose, the ends of the tube are applied to a voltage source, as shown in the embodiment of FIG. 1a, whose terminals are denoted 30, 29. If the tube 1 is to be heated by radiation, the winding 7 is constructed as a radiation heater, as in the embodiment of FIG. 1.

When the semiconductor tube 1 is heated up to a temperature that is necessary for precipitation, a mixture of a gaseous compound of the same semiconductor material and a reduction agent, are introduced through inlet tube 5. If the semiconductor tube 1 consists, for example, of silicon, the gaseous compound is, for example, silicochloroform, $SiHCl_3$, and the reduction gas is hydrogen, $H_2$. The hydrogen is introduced into tube 22 and flows, via valve 23, into valve 25, which is a mixer valve. Hydrogen via tube 26 enters container 27 which contains liquid silicochloroform. As the hydrogen flows through the $SiHCl_3$, it is charged with gaseous $SiHCl_3$. This gas mixture flows through valve 28, into mixer valve 25. Valves 23 and 28 are used to adjust the mole ratio of both gases while the throughput is adjusted by valve 25.

Silicon 11 is then precipitated at the heated locations in the interior 10 of the semiconductor tube 1. The excess gas mixture and the reaction product, in the present case, hydrogen chloride, escapes through outlet tube 6. To obtain a good utilization of the semiconductor tube 1, so much semiconductor material is precipitated until the interior 10 of the tube has grown together. The reaction is then stopped and the semiconductor tube, together with the precipitated semiconductor material, can be crushed and used as the starting material, for example, for crucible pulling.

If during the precipitation process, the semiconductor tube 1 is not to be situated in the open but is within a protective gas atmosphere, such semiconductor tube is enclosed by a reaction container or vessel, as in the embodiment of FIG. 2. The same reference numerals are assigned to similar parts in FIG. 2 as in FIGS. 1 and 1a. The semiconductor tube 1 is situated in a reaction vessel 14, such ass for example, a quartz ampule. The ends of the ampule 14 are provided with conical polished sections 15 and are sealed by stoppers 16 and 17, also provided with a conical ground section. Stopper 16 has therein outlet tube 18, while stopper 17 has an inlet tube 19 connected with a source 20, which provides the protective gas. The tubes which enter stoppers 3 and 4 are so elongated that they extend through the plugs 16 and 17. The winding 7 is shown situated outside the ampule but may also lie within the ampule. To precipitate semiconductor material in the interior of the semiconductor tube, the reaction mixture, as above-described, is introduced through the inlet tube 12 into the semiconductor tube 1 after the latter has been heated up. The excess reaction mixture and the reaction products, for example, hydrogen chloride, escape through tube 13.

The inside of the ampule 14 is filled with an inert gas such as, for example, argon or nitrogen, which is supplied by a source 20 and which flows via inlet tube 19 into the interior of the ampule 14. This protective gas circulates around the semiconductor tube 1 and the conical ground sections 2, so that impurities which are present in the atmosphere are reliably prevented from reaching the interior of the tube 1. The protective gas may emerge through outlet tube 18. It is sufficient, however, to fill the interior of the ampule 14 with a protective gas and to seal the ampule against the outside atmosphere. The semiconductor tube and the ampule are preferably made so long that the sealing places between the stopper and the tubular wall do not become excessively heated. It is then enough to seal the semiconductor tube 1 with a quartz stopper, for example, and the ampule 14 with the aid of a rubber stopper, for example.

The method according to the present invention provides a high precipitation rate without the precipitation of semiconductor material, at places other than the carrier body. Furthermore, since the semiconductor material has contact, only with the same semiconductor material, in the heated zone, the contamination of the semiconductor material with other substances is impossible.

For instance, a throughput of silicochloroform and hydrogen in a ratio of 1:10, of about 1,000 l/hr with a reaction temperature of 1,200°C gives a yield of 20 gm/hr or a yield of 20–25 percent. The other starting materials mentioned above, may also be used.

The invention is not limited to precipitating silicon. It may be used in the same manner, also for precipitating germanium in a germanium tube. This may be done at 750° to 900°C, for example with germanium techrachloride $GeCl_4$ and $H_2$. When SiC is precipitated in a tube consisting of SiC, the starting gaseous materials used are, for example, $SiCH_3Cl_3$ and $H_2$, which react at a temperature of 1,100° to 1,350°C. $A_{III}B_V$ compounds such as gallium arsenide, indium phosphide and indium antimonide may be precipitated from the halides, except the fluorides of corresponding materials, at temperatures of 850° to 110°C.

I claim:

1. A method of producing highly pure semiconductor material through the reaction of a gaseous compound having the same semiconductor material as a carrier body in the form of a semiconductor tube and a reduction gas, including the steps of: heating said carrier body to a temperature sufficient to cause precipitation of said semiconductor material; introducing said gaseous compound and said reduction gas into said tube, said tube being sealed against the outside atmosphere and functioning as a carrier body; and precipitating said semiconductor material on the interior of said tube by the continued application of heat until at least a portion of said tube is caused to melt together with the precipitated semiconductor material.

2. A method as claimed in claim 1, including the step of: precipitating said semiconductor material until such time as the interior of said tube has grown together.

3. A method as claimed in claim 1, including the steps of: crushing said tube and said precipitated semiconductor material as starting material for crucible pulling.

4. A method as claimed in claim 1, including the step of: heating said tube by means of a coil, energized by high frequency.

5. A method as claimed in claim 1, including the step of: heating said tube by direct current.

6. A method as claimed in claim 1, wherein the semiconductor tube is formed of silicon, and including the steps of: introducing a gaseous compound of silicon and a reduction gas of hydrogen into said semiconductor tube of silicon and heating a wall of said tube to cause the precipitation of silicon on the interior of said wall.

7. A method as claimed in claim 1, wherein the semiconductor tube is formed for germanium, and including the steps of: introducing a gaseous compound of germanium and a reduction gas of hydrogen into said semiconductor tube of germanium and heating a wall of said tube to cause the precipitation of germanium on the interior of said wall.

8. A method as claimed in claim 1, wherein the semiconductor tube is formed of silicon carbide, and including the steps of: introducing a gaseous compound of silicon and carbon and a reduction gas of hydrogen into said semiconductor tube of silicon carbide and heating a wall of said tube to cause the precipitation of silicon carbide on the interior of said wall.

9. A method as claimed in claim 1, wherein the semiconductor tube is formed of gallium arsenide, and including the steps of: introducing a non-fluoride halogenide gaseous compound into said semiconductor tube of gallium arsenide and heating a wall of said tube to cause the precipitation of gallium arsenide on the interior of said wall.

10. A method as claimed in claim 1, wherein the semiconductor tube is formed of indium phosphide, and including the steps of: introducing a non-fluoride halogenide gaseous compound into said semiconductor tube of indium phosphide and heating a wall of said tube to cause the precipitation of indium phosphide on the interior of said wall.

11. A method as claimed in claim 1, wherein the semiconductor tube is formed of indium antimonide, and including the steps of: introducing a non-fluoride halogenide gaseous compound into said semiconductor tube of indium antimonide and heating a wall of said tube to cause the precipitation of indium antimonide on the interior of said wall.

* * * * *